US011255962B2

(12) United States Patent
Wantenaar et al.

(10) Patent No.: US 11,255,962 B2
(45) Date of Patent: Feb. 22, 2022

(54) AUTOMOTIVE TESTING METHOD, SYSTEM AND COMPUTER PROGRAM PRODUCT

(71) Applicant: Siemens Industry Software Netherlands B.V., Eindhoven (NL)

(72) Inventors: Martinus Fransiscus Hendricus Wantenaar, Liempde (NL); Lucas Johannes Van Ewijk, Rijswijk (NL); Thijs Van Putten, Sassenheim (NL)

(73) Assignee: SIEMENS INDUSTRY SOFTWARE AND SERVICES B.V., Eindhoven (NL)

( * ) Notice: Subject to any disclaimer, the term of this patent is extended or adjusted under 35 U.S.C. 154(b) by 372 days.

(21) Appl. No.: 16/312,536

(22) PCT Filed: Jun. 26, 2017

(86) PCT No.: PCT/NL2017/050425
§ 371 (c)(1),
(2) Date: Dec. 21, 2018

(87) PCT Pub. No.: WO2017/222385
PCT Pub. Date: Dec. 28, 2017

(65) Prior Publication Data
US 2019/0227164 A1    Jul. 25, 2019

(30) Foreign Application Priority Data
Jun. 24, 2016 (EP) ..................................... 16176196

(51) Int. Cl.
*G01S 13/93*    (2020.01)
*G01S 7/40*    (2006.01)
(Continued)

(52) U.S. Cl.
CPC .......... *G01S 13/931* (2013.01); *G01S 7/4021* (2013.01); *G01S 7/4052* (2013.01); *G01S 13/90* (2013.01); *G01S 7/406* (2021.05)

(58) Field of Classification Search
CPC ..................................................... G01S 7/4021
(Continued)

(56) References Cited

U.S. PATENT DOCUMENTS

| 4,660,041 A | | 4/1987 | Maples et al. | |
| 5,223,840 A | * | 6/1993 | Cronyn | G01S 7/4052 342/170 |

(Continued)

OTHER PUBLICATIONS

Hao Huang et al: "Hardware-in-the-loop simulation technology of wide-band radar targets based on scattering center model"; Chinese Journal of Aeronautics, vol. 28, No. 5, Oct. 1, 2015 (Oct. 1, 2015), pp. 1476-1484, XP055325574, Amsterdam, NL ISSN: 1000-9361, DOI:10.1016/j.cja.2015.07.006; 2015.

(Continued)

*Primary Examiner* — Erin F Heard
*Assistant Examiner* — Helena H Seraydaryan
(74) *Attorney, Agent, or Firm* — Cozen O'Connor (57) ABSTRACT

An automotive testing method includes acquiring radar sensor data responsive to a radar excitation signal generated by a radar transmitting unit, forwarding the acquired radar sensor data to an electronic system of a radar receiving unit, generating radar data from the forwarded radar sensor data, and processing the radar data, wherein the step of acquiring radar sensor data includes generating synthetic radar data, the synthetic radar data being forwarded as radar sensor data to the electronic system of the radar receiving unit, where the synthetic radar data includes reflection signals, preferably all reflection signals, in a complex time series, that succeed each other and have the same temporal behavior within a synthetic period that lasts at least an order longer than a time period of the radar excitation signal.

20 Claims, 4 Drawing Sheets

(51) Int. Cl.
*G01S 13/931* (2020.01)
*G01S 13/90* (2006.01)

(58) Field of Classification Search
USPC .......................................................... 342/70
See application file for complete search history.

(56) References Cited

U.S. PATENT DOCUMENTS

| | | |
|---|---|---|
| 5,457,463 A | 10/1995 | Vencel et al. |
| 7,567,205 B1 | 7/2009 | Lee |
| 2010/0239170 A1* | 9/2010 | Asnis .................. G06K 9/3241 |
| | | 382/190 |
| 2017/0115378 A1* | 4/2017 | Haghighi .............. G01S 7/4052 |

OTHER PUBLICATIONS

Ergezer Halit et al: "Hardware-in-the-loop radar test simulator", 2014 4th International Conference on Simulation and Modeling Methodologies, Technologies and Applications (Simultech), Scitepress, pp. 666-673, XP032768670; 2014.
Weiskopf M. et al.: "Integrationslösung zur Absicherung eines realen Radarsensors im Systemverbund mit der Hardware-in-the-Loop Testtechnologie"; XP055325566; Retrieved from the Internet: URL:http://subs.emis.de/LNI/Proceedings/Proceedings240/29.pdf; 2015.
*PCT International Search Report and Written Opinion of International Searching Authority* dated Oct. 11, 2017 corresponding to PCT International Application No. PCT/NL2017/050425 filed Jun. 26, 2017.

* cited by examiner

AUTOMOTIVE TESTING METHOD, SYSTEM AND COMPUTER PROGRAM PRODUCT

CROSS-REFERENCE TO RELATED APPLICATIONS

This is a U.S. national stage of application No. PCT/NL2017/050425 filed Jun. 26, 2017. This application claims the priority of EP Application No. 16176196 filed Jun. 24, 2016, the content of which is incorporated herein by reference in its entirety.

BACKGROUND OF THE INVENTION

1. Field of the Invention

The invention relates to test systems and, more particularly, to an automotive testing method, system and computer program product.

2. Description of the Related Art

Automotive testing systems are known for the purpose of testing data acquisition units and data processing units processing sensor input data generated by said data acquisition units, thereby reducing expensive testing equipment and testing time in realistic traffic circumstances. As an example, data acquisition units can be provided with a camera unit having an optic system and an electronic system for capturing image data.

However, so far, radar systems have to be tested in realistic circumstances in order to evaluate how these systems react on radar input data. In this regard, it is noted that radar systems have a high data rate relative to the time scale of the radar signals.

SUMMARY OF THE INVENTION

It is an object of the invention to provide an automotive testing method that enables testing a radar system in laboratory circumstances.

This and other objects and advantages are achieved in accordance with the invention by an automotive testing method comprising acquiring radar sensor data responsive to a radar excitation signal transmitted by a radar transmitting unit, forwarding the radar sensor data to an electronic system of a radar receiving unit, generating radar data from the radar sensor data by the electronic system, forwarding the radar data to a data processing unit, and processing said radar data, by the processing unit, where acquiring radar sensor data includes generating synthetic radar data and where the synthetic radar data is forwarded as radar sensor data to the electronic system of the radar receiving unit, the synthetic radar data including reflection signals that succeed each other and have the same temporal behavior within a synthetic period that lasts at least an order longer than a time period of the radar excitation signal.

The invention is at least partly based on the insight that radar data do not significantly change in the time scale of the radar signals because vehicles do not move along relevant distances during a time period of a radar excitation signal, i.e., nanoseconds.

By generating synthetic radar data including reflection signals that succeed each other and that have the same temporal behavior within a synthetic period that lasts at least an order longer than a time period of the radar excitation signal, only a reduced number of reflection signals has to be computed per synthetic period, where the objects that are exposed to the radar excitation signal hardly move relative to each other. Consequently, there is substantially no loss in accuracy while, on the other hand, a considerably reduction of computational efforts is realized when performing a simulation of radar reflection signals. The synthetic radar data may include all reflections, in a complex time series, that have the same temporal behaviour within the synthetic period used that lasts at least an order longer than a time period of the radar excitation signal.

It is noted that, within the context of this disclosure, the expression "synthetic radar data" is to be understood to mean radar data that has been generated electronically by simulating data that is normally sensed by a radar sensing element converting an incoming radar signal into an electronic signal, also referred to as raw radar data.

Advantageously, the synthetic radar data can be generated from a spectral domain radar model, e.g., using an inverse Fast Fourth Transform (FFT) routine to generate the reflection signals.

Preferably, the synthetic radar data includes a first set of radar data with temporal reflection signals to be input to a pre-processing unit that is arranged for pre-processing radar sensor data, and a second set of radar data with range-doppler domain data to be input to a digital signal processing unit for evaluating radar data in the range-doppler domain.

The invention also relates to a system, and also relates to a computer program product. A computer program product may comprise a set of computer executable instructions stored on a data carrier, such as a flash memory, a CD or a DVD. The set of computer executable instructions, which allow a programmable computer to carry out the method as defined above, may also be available for downloading from a remote server, for example via the Internet, e.g. as an app.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

By way of example only, embodiments of the present invention will now be described with reference to the accompanying figures, in which.

DETAILED DESCRIPTION OF THE EXEMPLARY EMBODIMENTS

The figures merely illustrate preferred embodiments according to the invention. In the figures, the same reference numbers refer to equal or corresponding parts.

Figure 1:
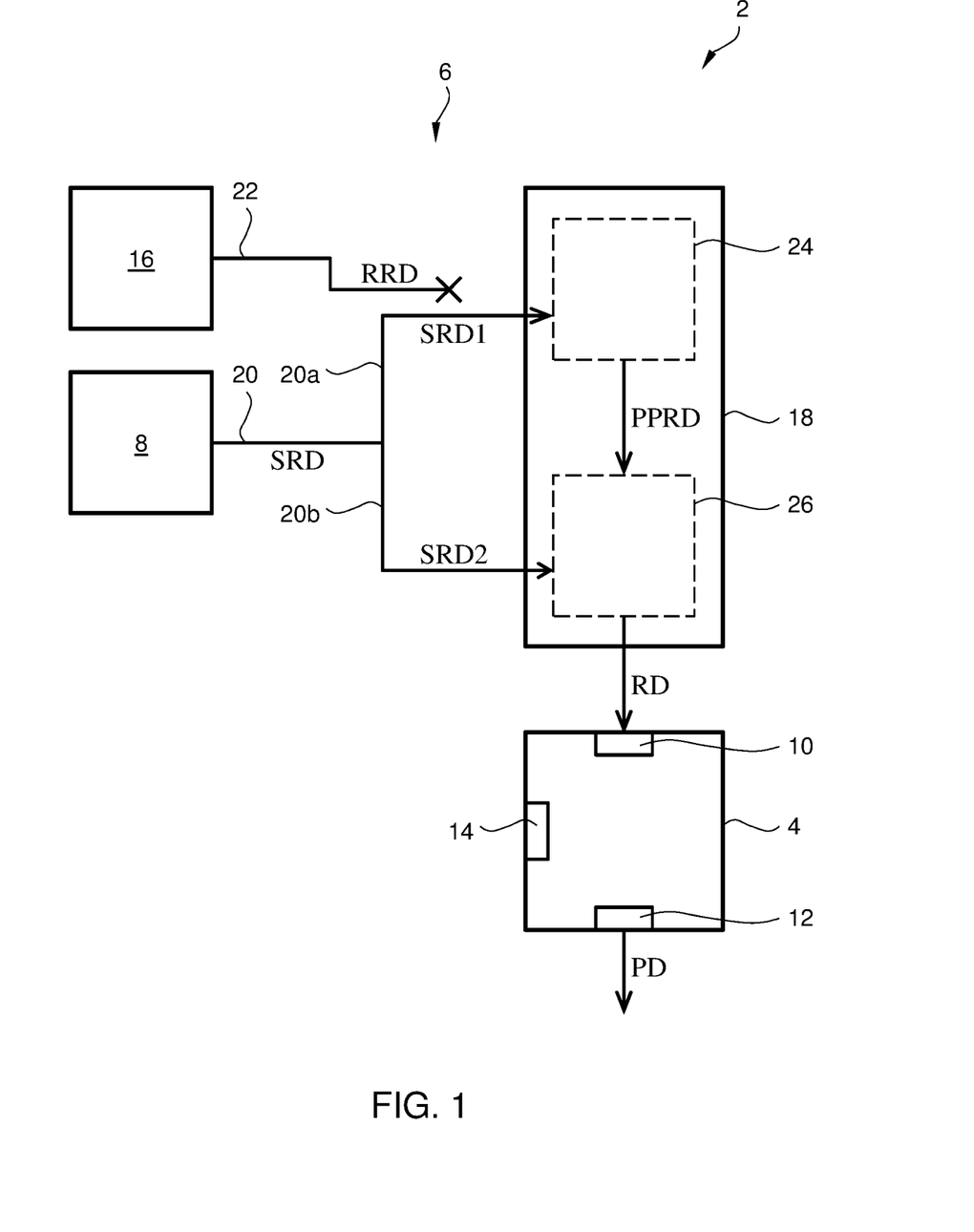
FIG. 1 shows a schematic view of an automotive testing system in accordance with the invention.

FIG. 1 shows a schematic view of an automotive testing system 2 in accordance with the invention. The system 2 comprises a data processing unit 4, a radar receiving unit 6 and a synthetic radar data generator 8.

The data processing unit 4 is provided with a data input port 10 for receiving radar data RD and a data output port 12 for transmitting processed data PD, e.g., for feeding a control unit for generating control data based on the processed data PD transmitted by the data processing unit 4. In the illustrated embodiment, the processing unit 4 further comprises an additional data input port 14, e.g., for receiving further input data, such as camera data.

The radar receiving unit 6 is arranged for generating and forwarding the radar data RD to the data input port 10 of the data processing unit 4 responsive to a radar excitation signal. The radar receiving unit 6 includes a radar sensing unit 16 and an electronic system 18. The radar sensing unit 16 is configured to convert an incoming electromagnetic radar signal into an electronic signal, also referred to as raw radar data RRD or radar sensor data. Typically, the radar sensing unit 16 includes an antenna. The electronic system 18 is configured to generate the radar data RD based on the raw radar data RRD that are received from the radar sensing element 16, under normal conditions when installed in a vehicle. Generally, for the purpose of generating the radar data RD, the electronic system receives radar sensor data representing raw radar data received from the radar sensing element.

Moreover, the synthetic radar data generator 8 of the automotive testing system 1 is configured to generate and transmit synthetic radar data SRD to the radar receiving unit 6 responsive to a radar excitation signal, in consecutive radar sample periods, thus mimicking radar signals that would occur if the radar receiving unit 6 is mounted on a vehicle facing realistic traffic situations, in order to simulate common real life traffic circumstances for testing the performance of the radar receiving unit 6 and the data processing unit 4 of the automotive testing system 2. For the purpose of transmitting the synthetic radar data SRD to the radar receiving unit 6, a data transmission channel 20 is provided which interconnects the synthetic radar data generator 8 to the electronic system 18 of the radar receiving unit 6. The data transmission channel 20 can be implemented as a wired transmission channel. However, in principle, the data transmission channel 20 can be formed in another way, e.g., based on wireless transmission technology.

During regular operation of the radar receiving unit 6, in a vehicle, the radar sensing unit 16 records incoming electromagnetic radar signals, as a response to transmitted radar excitation signals, and converts the incoming radar signals into electronic signals, thus generating raw radar data RRD or radar sensor data that is forwarded to the electronic system 18 of the radar receiving unit 6, via a sensor channel 22 interconnecting the radar sensing unit 16 to the electronic system 18.

In accordance with an embodiment of the invention, the raw radar data RRD generated by the radar sensing unit 16 forms not the basis of the radar data RD forwarded to the processing unit 4. In the illustrated embodiment, the sensor channel 22 is disconnected from the electronic system 18 while the data transmission channel 20 transmitting synthetic radar data SRD is connected to the electronic system 18. In principle, the transmission of the raw radar data RRD generated by the radar sensing unit 16 can be terminated by physically disconnecting respective transmission channels or by functionally disabling the transmission actions, using software. Further, the radar sensing element 16 can even be removed from the radar receiving unit 6.

Electronic radar sensor signals are then simulated by the synthetic radar data generator 8 so that the radar data generated by the radar receiving unit 6 are based on the synthetic radar data SRD transmitted to the electronic system 18 of the radar receiving unit 6. The synthetic radar data SDR may thus include a synthetic representation of real raw radar data generated by the radar sensing element 16. By generating synthetic radar data, a process of acquiring radar sensor data is performed. The synthetic radar data is forwarded as radar sensor data to the electronic system of the radar receiving unit.

By bypassing the radar sensing element 16 of the radar receiving unit 6, the electromagnetic part of the testing environment is effectively simulated thus enabling radar testing opportunities in laboratory conditions.

The synthetic radar data SDR generated by the synthetic radar data generator include reflection signals that succeed each other, in consecutive radar sample periods, and have the same temporal behavior within a synthetic period that lasts at least an order longer than a time period of the radar excitation signal, exploiting the insight that the timescale of change in the world is much larger than the timescale of the radar signals. By rendering synthetic radar data SDR that may include successive identical reflection signals, computational efforts are reduced considerably. The synthetic period can be one order, two orders, three or even more orders greater than the time period of the radar excitation signal or radar sample period. As an example, the reflection signals in the synthetic radar data SDR are invariant during a synthetic time period corresponding to a sampling rate ranging between circa 1 Hz and circa 1 kHz. In practice, the sampling rate can be chosen in a range between circa 20 Hz and circa 60 Hz. However, other sampling rates are also possible, e.g., 10 Hz or 100 Hz.

The synthetic radar data may include all reflections, in a complex time series, that have the same temporal behavior within the utilized synthetic period that lasts at least an order longer than a time period of the radar excitation signal or radar sample period. The succeeding reflection signals may have a similar time dependent shape, viz. having a similar curve over time. As an example, the reflection signal includes a reflected radar pulse that can be received after an excitation radar pulse is reflected by an object.

In a first exemplary embodiment, the synthetically generated reflection signals are identical during a first synthetic period, while the reflection signals during a second synthetic period, subsequent to the first synthetic period, are also mutually identical though different from the reflection signals in the first synthetic period. The reflection signals, in consecutive radar sample periods, then remain constant or identical during each synthetic period and can be computed by numerically evaluating a radar model at a time instant within the corresponding synthetic period.

In a second exemplary embodiment, the synthetically generated reflection signals during the first synthetic period are not identical but slightly different maintaining the same temporal behavior. Advantageously, the reflection signals may be interpolated over time, in consecutive radar sample periods, between a computed first synthetic reflection signal and a computed second synthetic reflection signal, the computed first synthetic reflection signal corresponding to a time instant within the first synthetic period, and the computed second synthetic reflection signal corresponding to a time instant within the second synthetic period following said first synthetic period. In the interpolation process, the arrival time and/or amplitudes of the reflection signal can be interpolated. The computed first and second synthetic reflection signals can be obtained by numerically evaluating a radar model at a time instant within the respective synthetic period.

When applying a ray tracing module in the radar model, reflection signals of the respective rays can be interpolated over time, in consecutive radar sample periods, between subsequent synthetic periods, each synthetic period corresponding to a step, where rays are evaluated in the ray tracing module. A first set of evaluated rays at a first step can be matched to a second set of evaluated rays at a second, subsequent step so that a meaningful interpolation at time instants within the synthetic periods can be performed. The set of evaluated rays can be then updated at each ray tracing step thus providing a complete description of a simulated scene. Again, using the temporal interpolation technique, a representation of the radar field can be obtained at a time scale, in consecutive radar sample periods, that is smaller than the synthetic periods or ray tracing step period.

The process of matching the rays at subsequent ray tracing steps can be performed by introducing a physical definition determining when a ray of a first ray tracing step follows the same physical path as a ray of a second, consecutive, ray tracing step. Optionally, a heuristic can be applied to determine a probability that two rays from consecutive time steps meet the physical definition of following the same physical path. In a specific embodiment, the heuristic for a multiple number or all rays from consecutive ray tracing steps are optimized using an optimization algorithm, e.g., an iterative optimization algorithm. Consequently, the intensity and the path length of the matched rays can be updated.

Figure 4:
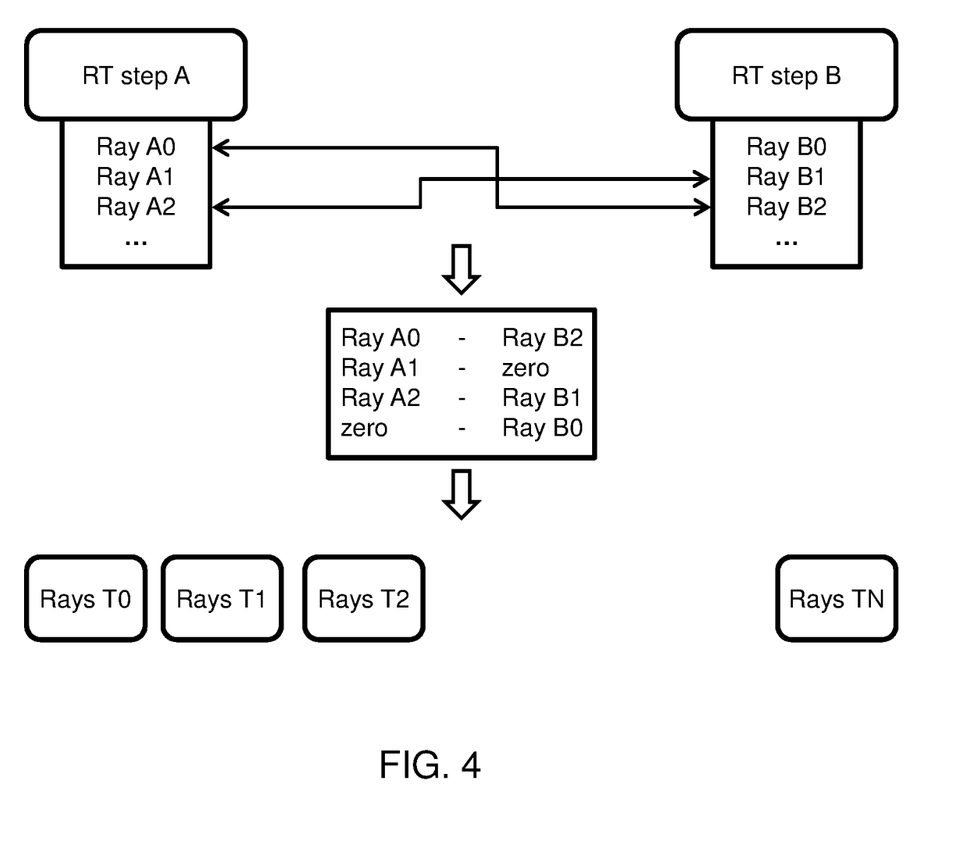
FIG. 4 shows a schematic diagram illustrating the matching process in accordance with the invention.

FIG. 4 shows a diagram illustrating the matching process. In the top part, the diagram shows a first set of rays AO, A1, A2 etc that have been evaluated at a first ray tracing step RT step A, as well as a second set of rays BO, B1, B2 etc that have been evaluated at a second ray tracing step RT step B. The ray tracing steps are performed at a relatively low sample rate, such as between circa 10 Hz and circa 100 Hz. Interconnecting arrows symbolically denote a match between individual rays in the consecutive ray tracing steps. In the middle part, an exemplary overview of matching rays is shown also indicating that not all rays match. In the lower part, the diagram shows consecutive ray representations Rays To, Rays T1, Rays T2, Rays TN including the interpolated reflection signals, in consecutive radar sample periods, at a radar sample rate that is higher than the ray tracing sample rate, such as in the GHz regime.

It is noted that instead of applying a ray tracing module in the radar model, other radar models can be used, e.g., applying a finite element algorithm.

Advantageously, the synthetic radar data can be obtained through an inverse Fourier transform from data generated from a radar model in a spectral domain, such as in a range-doppler domain.

In the embodiment shown in FIG. 1, the electronic system 18 of the radar receiving unit 6 includes a pre-processing unit 24 and a digital signal processing unit 26. The pre-processing unit 24 is configured to preprocess the radar sensor data representing the raw radar data, i.e., the synthetic radar data SRD, in the automotive testing system 2. Preprocessing steps may include "backend" processing such as an analogue to digital conversion step, a sampling step and/or a noise suppressing step, finally resulting in pre-processed radar sensor data PPRD. The digital signal processing unit 26 is configured to generate the radar data RD to be forwarded to the data processing unit 4 of the automotive testing system 2, based on the pre-processed radar sensor data PPRD. Specifically, the digital signal processing unit 26 may be arranged for performing a step of object detection, a step of clustering and/or a step of tracking a cluster or object.

Generally, the radar processing steps are related to the applied type of radar signals. Various radar signal types may be applied for radar systems in vehicles including frequency modulated continuous wave FMCW, Doppler, frequency-shift keying FSK, binary frequency-shift keying BFSK, phase-shift keying PSK or differential phase-shift keying DPSK. In case of FMCW, a continuous wave signal is modulated in frequency to produce a linear sweep signal that is transmitted as an excitation signal. The later received echo is mixed with a portion of the transmitted signal to produce a beat frequency signal that is proportional with a round trip time covering the two-way distance between the radar and an object. The beat frequency signal is then subjected to a temporal FFT algorithm and a speed FFT algorithm. The result can be visualized in a "range-doppler diagram". Radar data that may be obtained using other radar principles may also be represented in a range-doppler diagram.

Figure 2:
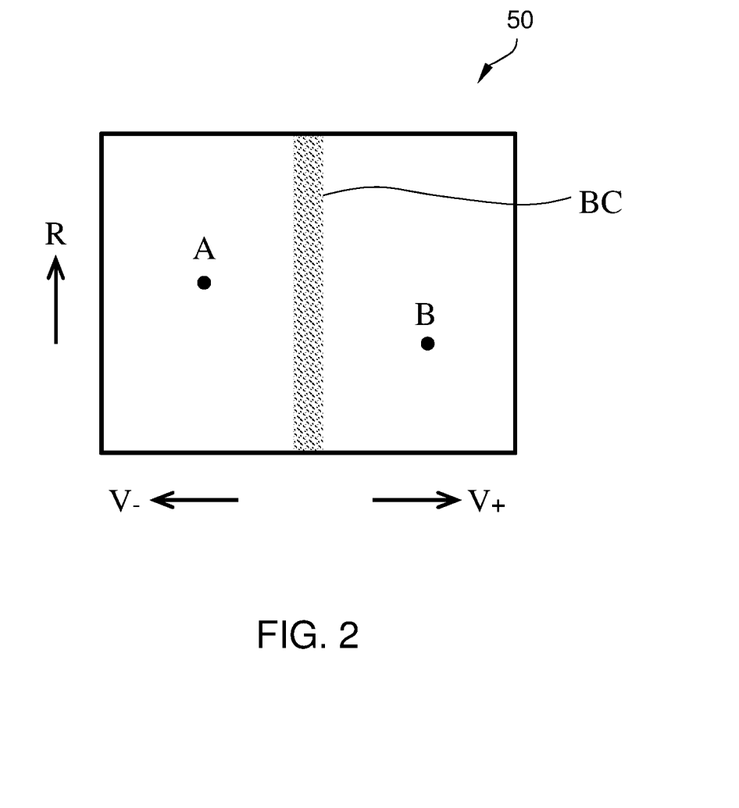
FIG. 2 shows a range-doppler diagram.

FIG. 2 shows an example of a range-doppler diagram 50, where an object velocity V+, V. is a function of the horizontal axis, while an object range R is a function of the vertical axis. The diagram or domain 50 contains a mainly vertical band of clutter related reflection data BC. Clutter data BC is correlated to stationary objects such as buildings, trees, leaves and grass. The diagram or domain further contains reflection data of a first object A moving away from the radar and reflection data of a second object B moving towards the radar.

In the embodiment shown in FIG. 1, the data transmission channel 20 that is used for transmitting the synthetic radar data SRD from the synthetic radar data generator 8 towards the electronic system 18 of the radar receiving unit 6 is connected to both the pre-processing unit 24 and the digital processing unit 26 of the electronic system 18. The transmission channel 20 includes a first branch 20a connected to the pre-processing unit 24 for transmitting a first set of synthetic radar data SDR1 with temporal reflection signals. The transmission channel 20 further includes a second branch 20b connected to the digital processing unit 26 for transmitting a second set of synthetic radar data SDR2 with range-doppler domain data.

The above-mentioned second set of synthetic radar data SDR2 includes clustered radar data representing an ensemble of reflecting objects. Preferably, the clustered radar data are related to clutter signals.

Consequently, the first set of synthetic radar data SDR1 relates to a temporal representation of radar response signals caused by non-clutter objects such as the first object A and the second object B in the range-doppler diagram 50 moving away from and towards the radar, respectively. The second set of synthetic radar data SDR2 relates to a spectral representation of radar response signals caused by clutter objects associated with the clutter data BC in the range-doppler diagram 50. The first set of synthetic radar data SDR1 is transmitted to the pre-processing unit 24 while the second set of synthetic radar data SDR2 is transmitted to the digital signal processing unit 26.

As indicated above, the synthetic radar SDR may be generated from a spectral domain radar model. Advantageously, the second set of synthetic radar data SDR2 is directly generated using the spectral domain radar model. Consequently, a transformation of data to another computational domain might be superfluous, thereby even further reducing computation efforts. Further, any computation of large clutter areas in the time domain, which is inherently computationally demanding especially when performed at a radar timescale of nanoseconds, might be avoided. Again, the insight is exploited that radar reflection signals do not change substantially during the time period of the radar excitation signal because vehicles do not change position that fast.

Moreover, a step of clustering data can be performed in the spectral domain as well, i.e., a step of combining reflection signal contributions caused by different reflecting objects to process the combined signal contributions together. In the above-described implementation, the clustered data relate to reflection signals caused by different clutter objects, such as buildings, trees, leaves and grass or other stationary or static objects. The clutter objects typically are well known parts of a scene and/or the clutter objects are static or stationary such that the results of processing the associated reflection signals from the time domain into the spectral domain are known in advance. By forwarding the processed data in the range-doppler domain, the computation of corresponding time domain radar data becomes superfluous, thereby saving computation efforts. Generally, computation time can be saved if the result of processing steps resulting in spectral data is known in advance, viz. by inserting these spectral data as range-doppler domain data.

Alternatively, the synthetic radar data SDR may include a synthetic representation of cluster data that is related to a specific object or specific objects, e.g., the object A moving away from the radar, where the second synthetic radar data SDR2 is transmitted to the digital signal processing unit 26. Further, almost all synthetic radar data SDR may relate to cluster data in the range-doppler domain, where all the synthetic radar data SDR is transmitted to the digital signal processing unit 26. Otherwise, all synthetic radar data SDR may simulate time-domain raw radar data that is transmitted to the pre-processing unit 24. As a result, no synthetic radar data SDR is transmitted directly to the digital signal processing unit 26.

It is noted that the data processing unit 4 may receive further radar data and/or other sensor signals, such as laser signals, infrared signals, radar signals, acoustic signals, ultrasonic signals, pressure signals or electronic signals received in a wired or wireless way and representing any type of measured physical signals associated with automotive conditions or parameters. The signals may relate to automotive conditions or parameters of a vehicle in which the sensor unit is mounted or automotive conditions or parameters of other vehicles forwarding such signals to the sensor unit. It is further noted that the automotive testing system may include a multiple number of acquisition units, such as the described radar receiving unit, where sensor data are simulated using synthetic radar data. By providing multiple sensor data, a realistic process of processing sensor data may be simulated.

Optionally, synthetic radar data simulating radar reflections of a car or another curved surface can be generated using a ray tracing method, where a smoothly varying surface normal vector is taken into account via interpolation when computing reflection caused by an elementary polygon cell in the exterior of the car. Here, the surface normal and the radii of curvature between the vertices of the meshes are interpolated so that the surface can be meshed in a relatively coarse way saving computation efforts. Generally, the exterior of a car has a curved shape. By meshing the exterior of the car, or at least a portion of the car exterior receiving an incident radar beam, into a multiple number of elementary polygon cells, the entire reflection can be computed by evaluating the partial reflections caused by the individual polygon cells, e.g., using a ray tracing method, and combining these partial reflections coherently. Advantageously, when smoothly varying the surface normal vector of the individual polygon cells, in an interpolating manner, a relatively accurate radar reflection can be computed while computational efforts remain relatively moderate as the exterior surface of the car can be meshed in a relatively coarse manner. As a result, computational efficiency and accuracy can be improved and any reduction of accuracy caused by the coarse mesh can at least partially be corrected. The optional method of simulating radar reflections from curved surfaces is in itself known from another field of visualization, namely 3D computer graphics, viz. as Phong shading.

Figure 3:
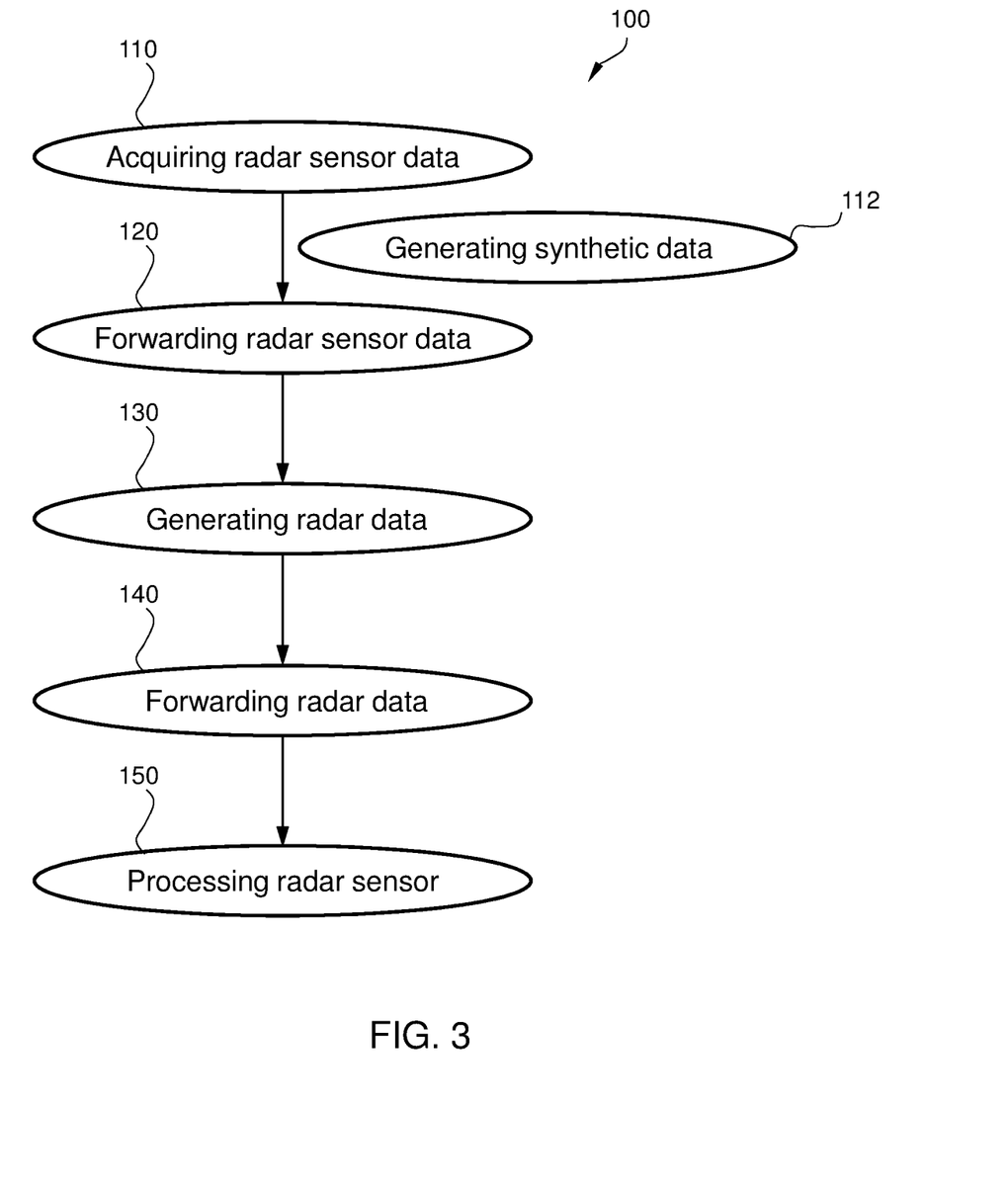
FIG. 3 shows a flow chart of a method in accordance with the invention.

FIG. 3 shows a flow chart of an embodiment of a method in accordance with the invention. The method 100 is used for automotive testing, and comprises acquiring 110 radar sensor data responsive to a radar excitation signal transmitted by a radar transmitting unit, forwarding 120 the radar sensor data to an electronic system of a radar receiving unit, generating 130 radar data from the radar sensor data, by the electronic system, forwarding 140 the radar data to a data processing unit, and a step of processing 150 the radar data by the processing unit, where acquiring 110 radar sensor data includes generating 112 synthetic radar data and where the synthetic radar data is forwarded as radar sensor data to the electronic system of the radar receiving unit, the synthetic radar data including reflection signals, preferably all reflection signals, in a complex time series, that succeed each other and have the same temporal behaviour within a synthetic period that lasts at least an order of magnitude longer than a time period of the radar excitation signal. By generating synthetic radar data using a synthetic radar data generator, and forwarding the synthetic radar data to an electronic system of the radar receiving unit as radar sensor data a simulation of real sensor data is performed, bypassing a radar sensing element that during normal operation conditions of the radar receiving unit converts an incoming radar signal into an electronic signal for transmission to the electronic system as raw radar data.

The method of automotive testing can be facilitated using dedicated hardware structures, such as computer servers. Otherwise, the method can also at least partially be performed using a computer program product comprising instructions for causing a processor of a computer system to facilitate automotive testing. All (sub)steps can in principle be performed on a single processor. However, it is noted that at least one step can be performed on a separate processor. A processor can be loaded with a specific software module. Dedicated software modules can be provided, e.g., from the Internet.

The invention is not restricted to the embodiments described herein. It will be understood that many variants are possible.

It is noted that the electronic system 23 of the radar receiving unit 6 may include a single or a multiple number of units for processing radar data.

It is further noted that generating synthetic radar data simulating radar reflections of a car using a ray tracing method, where the surface normal and the radii of curvature between the vertices of the meshes are interpolated, so that an interpolating smoothly varying surface normal vector is taken into account when computing reflection caused by an elementary polygon cell in the exterior of a car or another curved surface, cannot only be used in the claimed automotive testing method, but more generally in automotive testing, comprising the steps of acquiring radar sensor data and processing said radar sensor data.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An automotive testing method, comprising:
    acquiring radar sensor data responsive to a radar excitation signal transmitted by a radar receiver;
    forwarding the acquired radar sensor data to an electronic system of a radar receiver;
    generating, by the electronic system, radar data from the radar sensor data;
    forwarding the generated radar data to a data processor; and
    processing, by the processor, said forwarded radar data;
    wherein said acquiring radar sensor data includes generating synthetic radar data which is forwarded as radar sensor data to the electronic system of the radar receiver, the synthetic radar data including reflection signals which succeed each other and have the same temporal behavior within a synthetic period which lasts at least an order longer than a time period of the radar excitation signal, the method further comprising:
    computing a first synthetic reflection signal corresponding to a time instant within a first synthetic period;
    computing a second synthetic reflection signal corresponding to a time instant within a second synthetic period consecutive to the first synthetic period; and
    interpolating the reflection signals over time between the first and second synthetic reflection signals.

2. The automotive method according to claim 1, wherein the reflection signals succeed each other in consecutive radar sample periods.

3. The automotive method according to claim 1, wherein the succeeding reflection signals have a similar time dependent shape.

4. The automotive method according to claim 2, wherein the succeeding reflection signals have a similar time dependent shape.

5. The automotive method according to claim 1, wherein the first and second synthetic reflection signals are computed by numerically evaluating a radar model applying a ray tracing module; and wherein each synthetic period corresponds to a step during which rays are evaluated in the ray tracing module.

6. The automotive method according to claim 5, further comprising:
    matching a first set of evaluated rays at a first ray tracing step to a second set of evaluated rays at a second, subsequent ray tracing step.

7. The automotive testing method according claim 1, wherein the synthetic radar data include all reflection signals, in a complex time series, which succeed each other and which have the same temporal behavior within a synthetic period that lasts at least an order longer than a time period of the radar excitation signal.

8. The automotive testing method according to claim 1, wherein the synthetic period corresponds to a sampling rate ranging between circa 1 Hz and circa 1 kHz.

9. The automotive testing method according to claim 1, wherein said transmitting the synthetic radar data to the electronic system of the radar receiving unit includes bypassing a radar sensing element that is arranged for converting an incoming radar signal into raw radar data.

10. The automotive testing method according to claim 1, wherein the synthetic radar data are generated from a spectral domain radar model.

11. The automotive testing method according to claim 1, wherein the synthetic radar data includes a first set of radar data with temporal reflection signals.

12. The automotive testing method according to claim 1, wherein the synthetic radar data includes a second set of radar data with range-doppler domain data.

13. The automotive testing method according to claim 12, wherein the second set of radar data includes clustered radar data representing an ensemble of reflecting objects.

14. The automotive testing method according to claim 13, wherein the clustered radar data includes clutter signals.

15. The automotive testing method according to claim 1, wherein synthetic radar data simulating radar reflections of a car are generated including the steps of:
    meshing the exterior surface of the car coarsely; and
    applying a ray tracing method while interpolating the surface normal and the radii of curvature between vertices of the meshes.

16. An automotive testing system, comprising:
    a radar transmitter which transmits a radar excitation signal;
    a radar receiver having an electronic system which generates radar data from radar sensor data acquired in response to said radar excitation signal; and
    a data processor having a data input port for receiving radar data from the electronic system of the radar receiver and a data output port for transmitting processed data;
    a synthetic radar data generator which generates synthetic radar data and forwards said synthetic radar data as radar sensor data to the electronic system of the radar receiver, the synthetic radar data including reflection signals which succeed each other and which have the same temporal behavior within a synthetic period that lasts at least an order longer than a time period of the radar excitation signal;
    wherein said synthetic radar generator additionally:
        computes a first synthetic reflection signal corresponding to a time instant within a first synthetic period;

computes a second synthetic reflection signal corresponding to a time instant within a second synthetic period consecutive to the first synthetic period; and interpolates the reflection signals over time between the first and second synthetic reflection signals.

17. The automotive testing system according to claim 16, further comprising:
a data transmission channel interconnecting the synthetic radar data generator to the electronic system of the radar receiver;
wherein the electronic system is arranged so as to generate the radar data based on radar sensor data representing raw radar data received from a radar sensing element converting an incoming radar signal into an electronic signal.

18. The automotive testing system according to claim 17, wherein the electronic system of the radar receiver comprises a pre-processing processor which pre-processes the radar sensor data, and a digital signal processor which generates, based on the pre-processed radar sensor data, the radar data to be forwarded to the data processor; and wherein the data transmission channel includes a first branch connected to the pre-processing processor of the electronic system.

19. An automotive testing system according to claim 18, wherein the data transmission channel includes a second branch connected to the digital signal processor of the electronic system.

20. A non-transitory computer program product for automotive testing, the computer program product comprising computer readable code for causing a processor to:
generate synthetic radar data and forward said synthetic radar data as radar sensor data to the electronic system of the radar receiver of the automotive testing system according to claim 16.

* * * * *